US011080241B2

(12) United States Patent
Crane et al.

(10) Patent No.: US 11,080,241 B2
(45) Date of Patent: Aug. 3, 2021

(54) DOCUMENT COLLABORATION

(71) Applicant: ServiceNow, Inc., Santa Clara, CA (US)

(72) Inventors: Jonathan Richard Crane, San Diego, CA (US); Senthil Rajavallipuram Meenakshisundaram, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 37 days.

(21) Appl. No.: 16/403,162

(22) Filed: May 3, 2019

(65) Prior Publication Data

US 2020/0349120 A1 Nov. 5, 2020

(51) Int. Cl.
*G06F 16/176* (2019.01)
*G06F 16/16* (2019.01)
*G06F 16/18* (2019.01)
*G06F 40/169* (2020.01)

(52) U.S. Cl.
CPC ........ *G06F 16/1774* (2019.01); *G06F 16/164* (2019.01); *G06F 16/1873* (2019.01); *G06F 40/169* (2020.01)

(58) Field of Classification Search
CPC .... G06F 16/93; G06F 16/176; G06F 16/1873; G06F 16/1774; G06F 16/164; G06F 40/169
USPC ........................................................ 707/783
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

*Primary Examiner* — Robert W Beausoliel, Jr.
*Assistant Examiner* — Pedro J Santos
(74) *Attorney, Agent, or Firm* — Fletcher Yoder, P.C.

(57) ABSTRACT

A method includes transmitting, from a service platform customer instance, first data associated with a document to a first user device. The method further includes transmitting, from the service platform customer instance, second data associated with the document to a second user device. The method further includes receiving, at the service platform customer instance, a request from the first user device a request to make a change to the document from the first user device. The method further includes transmitting, from the service platform customer instance to the second user device, a request for permission to make the change. The method further includes updating, at the service platform customer instance, the document based on the change in response to receiving permission to make the change from the second user device.

20 Claims, 11 Drawing Sheets

(56) References Cited

U.S. PATENT DOCUMENTS

| | | |
|---|---|---|
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,628,631 B1 * | 4/2020 | Smuda ................ H04L 65/4015 |
| 2006/0053380 A1 * | 3/2006 | Spataro ................... G06F 16/93 715/753 |
| 2013/0185252 A1 * | 7/2013 | Palmucci ............... G06F 40/197 707/608 |

* cited by examiner

DOCUMENT COLLABORATION

TECHNICAL FIELD

Embodiments described herein generally relate to document collaboration.

BACKGROUND ART

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For users that are enterprises and other organizations, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

Systems and methods for collaborating during document creation are disclosed. The disclosed systems and methods may support multiple users concurrently editing a document. Further, the disclosed systems and method may request permission from an authorized account before entering requested edits. In addition, the disclosed systems and methods may support a chat interface displayed alongside document content. Accordingly, the disclosed systems and methods may be more efficient as compared to document creation techniques that rely on users creating and editing documents through separate offline workflows.

According to one embodiment of the present disclosure, a method includes transmitting, from a service platform customer instance, first data associated with a document to a first user device. The method further includes transmitting, from the service platform customer instance, second data associated with the document to a second user device. The method further includes receiving, at the service platform customer instance, a request from the first user device a request to make a change to the document from the first user device. The method further includes transmitting, from the service platform customer instance to the second user device, a request for permission to make the change. The method further includes updating, at the service platform customer instance, the document based on the change in response to receiving permission to make the change from the second user device.

In another embodiment, the method may be embodied in computer executable program code and stored in a non-transitory storage device. In yet another embodiment, the method may be implemented in an electronic device.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
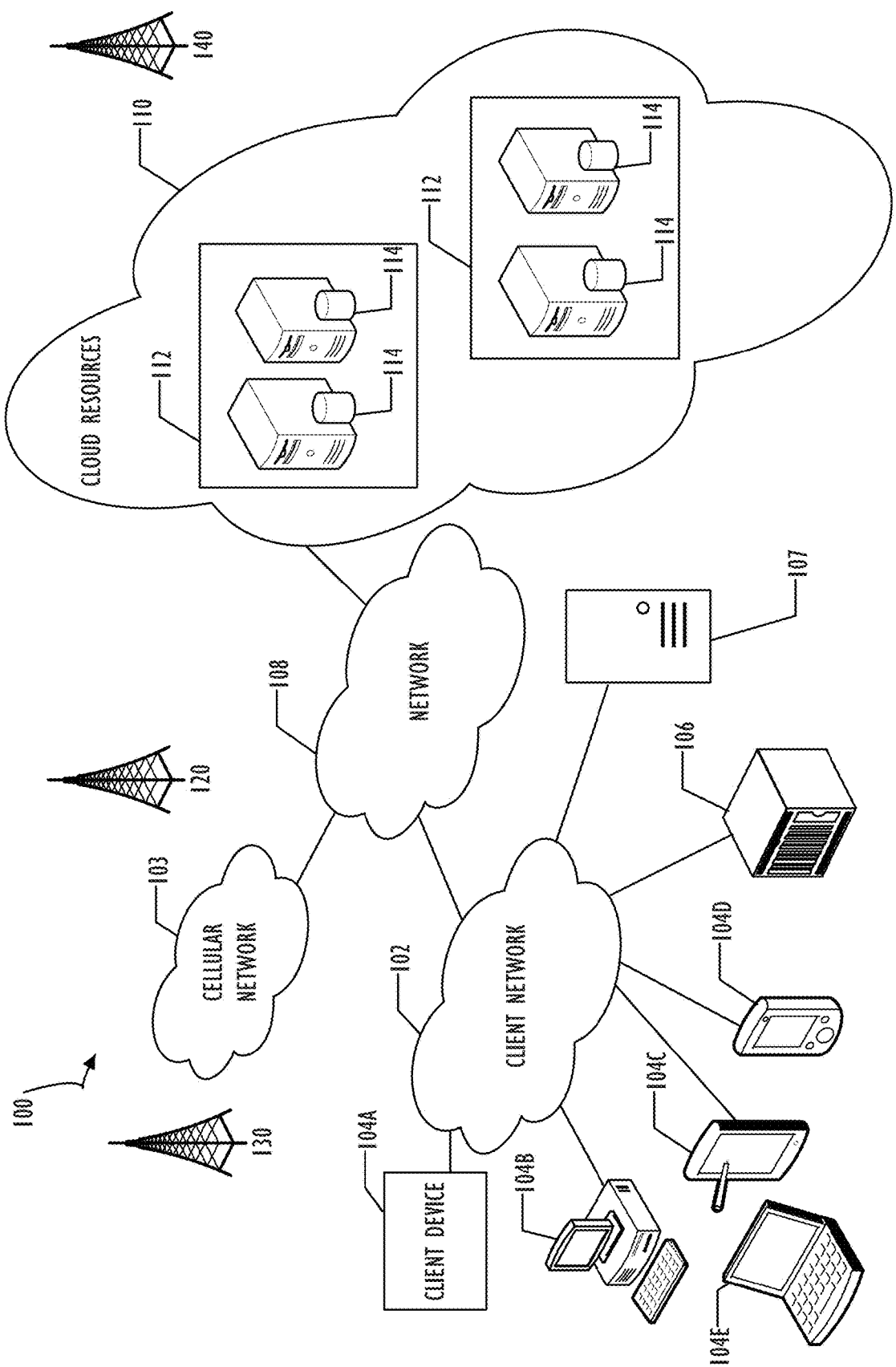
FIG. 1 illustrates a block diagram of cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing device" may refer to a device that includes, but is not limited to a single computer, host, server, laptop, and/or mobile device.

As used herein, a computer-readable storage device is an article of manufacture.

As used herein, the term "network device" may refer to any device that is capable of communicating and transmitting data to another device across any type of network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Sequences of method steps presented herein are provided as examples and are not meant to be limiting. Thus, methods according to the disclosure may be performed in an order alternative to that illustrated in the figures and described herein. To illustrate, a method described as including steps "A" and "B" may be performed with "A" either preceding or following "B," unless a specific order is indicated.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102.

FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that can communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, field service and/or other organization-related functions. In one embodiment, the cloud resources platform/network 110 includes one or more data centers 112, where each data center 112 could correspond to a different geographic location. Within a data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign an identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules.

Figure 2:
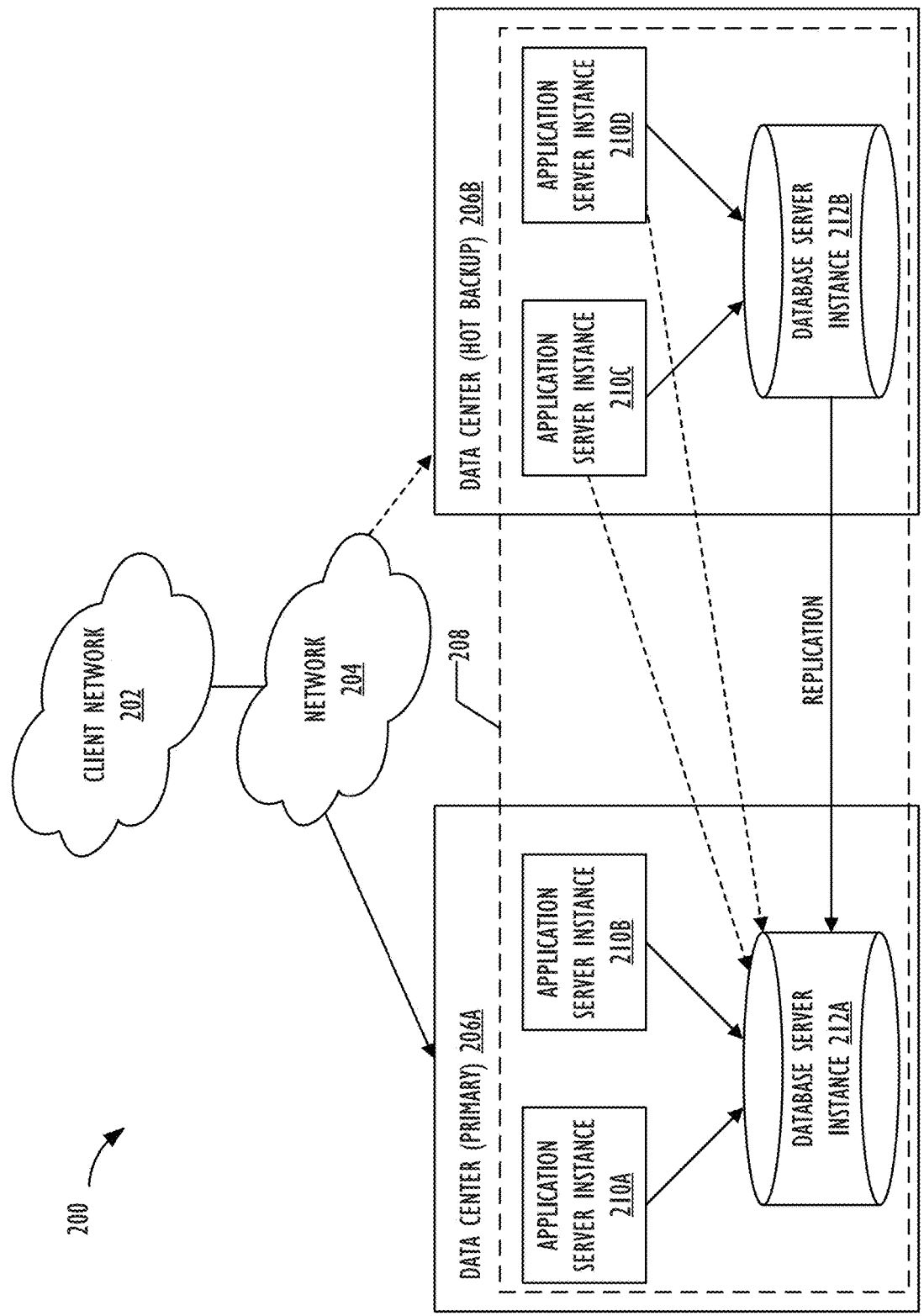
FIG. 2 illustrates a block diagram of multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, the client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. About FIG. 2, data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing infrastructure 100 and multi-instance cloud architecture 200, respectively, the disclosure is not limited to the specific embodiments illustrated in FIGS. 1 and 2. For example, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1-2 are only exemplary to facilitate ease of description and explanation. The system 200 may be arranged differently than shown. For example, the client instance 208 may be provided by devices spread across more than two data centers. In addition, data centers may include a different number of application server instances than shown and/or a different number of database server instances than shown.

Figure 3:
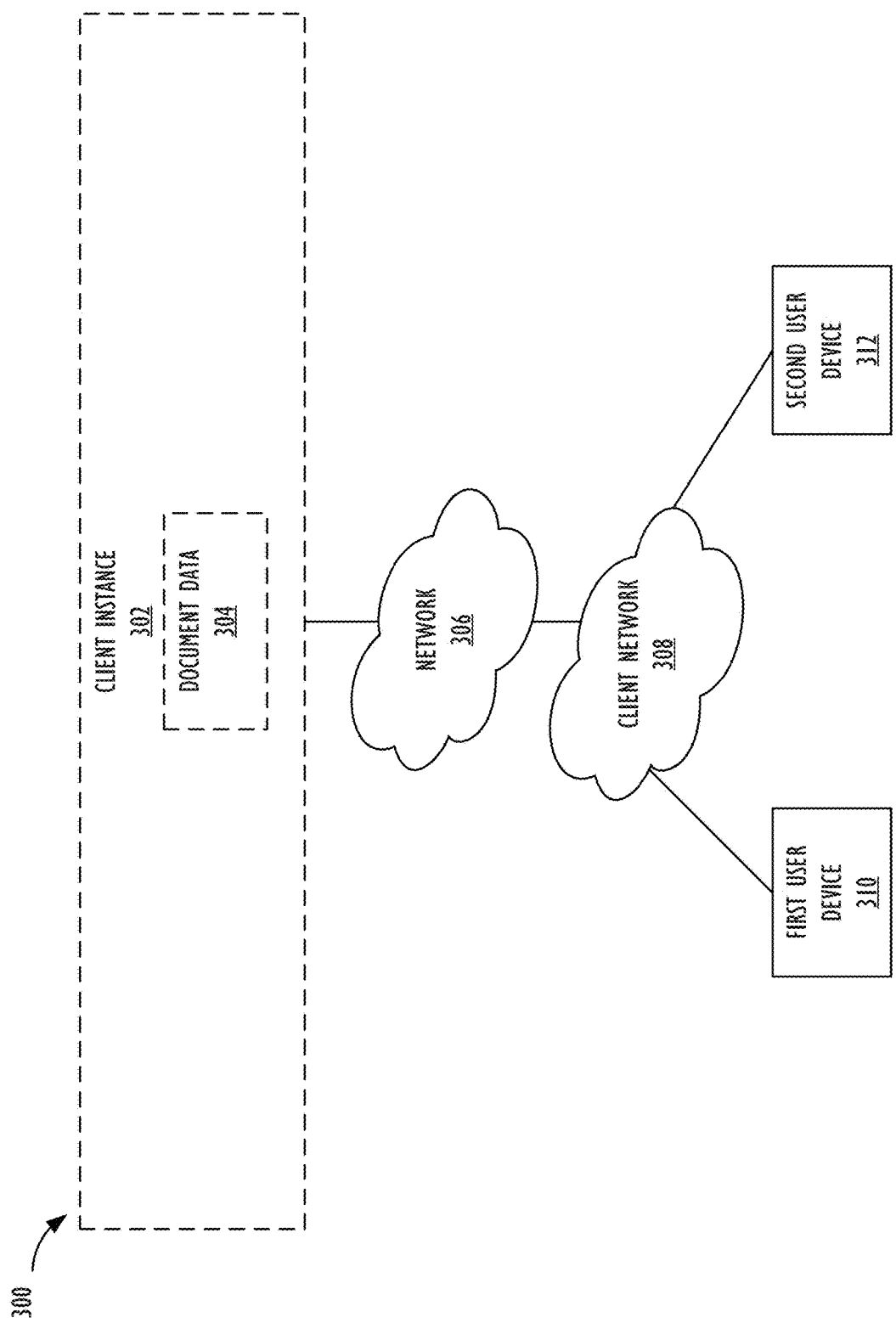
FIG. 3 illustrates a block diagram of a multi-instance cloud architecture 300 configured to support document collaboration between at least two devices.

Referring to FIG. 3, a diagram of a multi-instance cloud architecture 300 for supporting document collaboration is shown. The multi-instance cloud architecture 300 includes a client instance 302, a network 306, a client network 308, a first user device 310, and a second user device 312. As described above with respect to FIGS. 1 and 2, a client instance, such as the client instance 302, may correspond to a collection of services provided by one or more physical computing devices of a cloud computing provider. In some examples, the client instance 302 corresponds to the client instance 208 depicted in FIG. 2.

The network 306 may include a WAN (e.g., the Internet), a LAN (e.g., a network of a cloud computing provider), or a combination thereof. The network 306 may correspond to the network 108 of FIG. 1 and/or the network 204 of FIG. 2. The client network 308 may include a LAN, a virtual network, a data center, an enterprise network, or a combination thereof associate with a client of a cloud computing network.

The first user device 310 and the second user device 312 correspond to computing devices, such as personal computing devices, mobile phone devices, tablet computing devices, etc., or a combination thereof. The first user device 310 and the second user device 312 may communicate with the client instance 302 through the client network 308 and the network 306 to access one or more cloud services. In the illustrated example, the client instance 302 stores document data 304. For example, the document data 304 may be stored by a database server instance (e.g., the database server instances 212A, 212B of FIG. 2) of the client instance 302. The user devices 310, 312 communicating with an application server instance (e.g., the application server instances 210A, 210B, 210C, 210D of FIG. 2) of the client instance 302 may collaboratively edit a document represented by the document data 304, as described further herein. While not illustrated, additional user devices may collaboratively edit the document.

The document data 304 may include metadata, template data, content data, activity data, collaboration, data, other data, or a combination thereof. Metadata may include metadata tags and associated metadata values. Content data may correspond to content of a document. In some implementations the content of the document is divided into discrete sections that may be individually edited. Activity data may indicate changes made to the document. Collaboration data may include chat messages, requests for permission to make changes, or a combination thereof. Template data may reference content data and/or metadata that is to be preloaded into the document by the client instance 302.

The document data 304 may be created by the client instance 302 in response to a request to create a document received from one of the user devices 310, 312. In an illustrative example, the client instance 302 sends a graphical user interface (GUI) to the first user device 310 in response to receiving a request to access the client instance 302 from the first user device 310. The GUI may correspond to a portal to various services provided by the client instance 302. In some implementations, sending the portal GUI to the first user device 310 is contingent on the request to access the client instance 302 being associated with an authenticated first user account associated with the client instance 302. The request to generate the document may correspond to user input received by the client instance 302 through the portal GUI provided to the first user device 310. The request to generate the document may include identification of a template, a metadata tag, a metadata value, identification of a type of document, a description of a document, a request identifier, identification of a user account associated with the request (e.g., the first user account), or a combination thereof.

While FIG. 3 depicts a particular system for document collaboration, alternative systems may also support document collaboration. For example, alternative systems may not include cloud computing services. In such examples, functions attributed to the client instance 302 may be provided by one or more unabstracted physical devices (e.g., server devices, database devices, etc.). Further, the network 306 and the client network 308 may correspond to a single network rather than distinct networks in some examples. Thus, a variety of systems may support document collaboration according to the disclosure.

Figure 4:
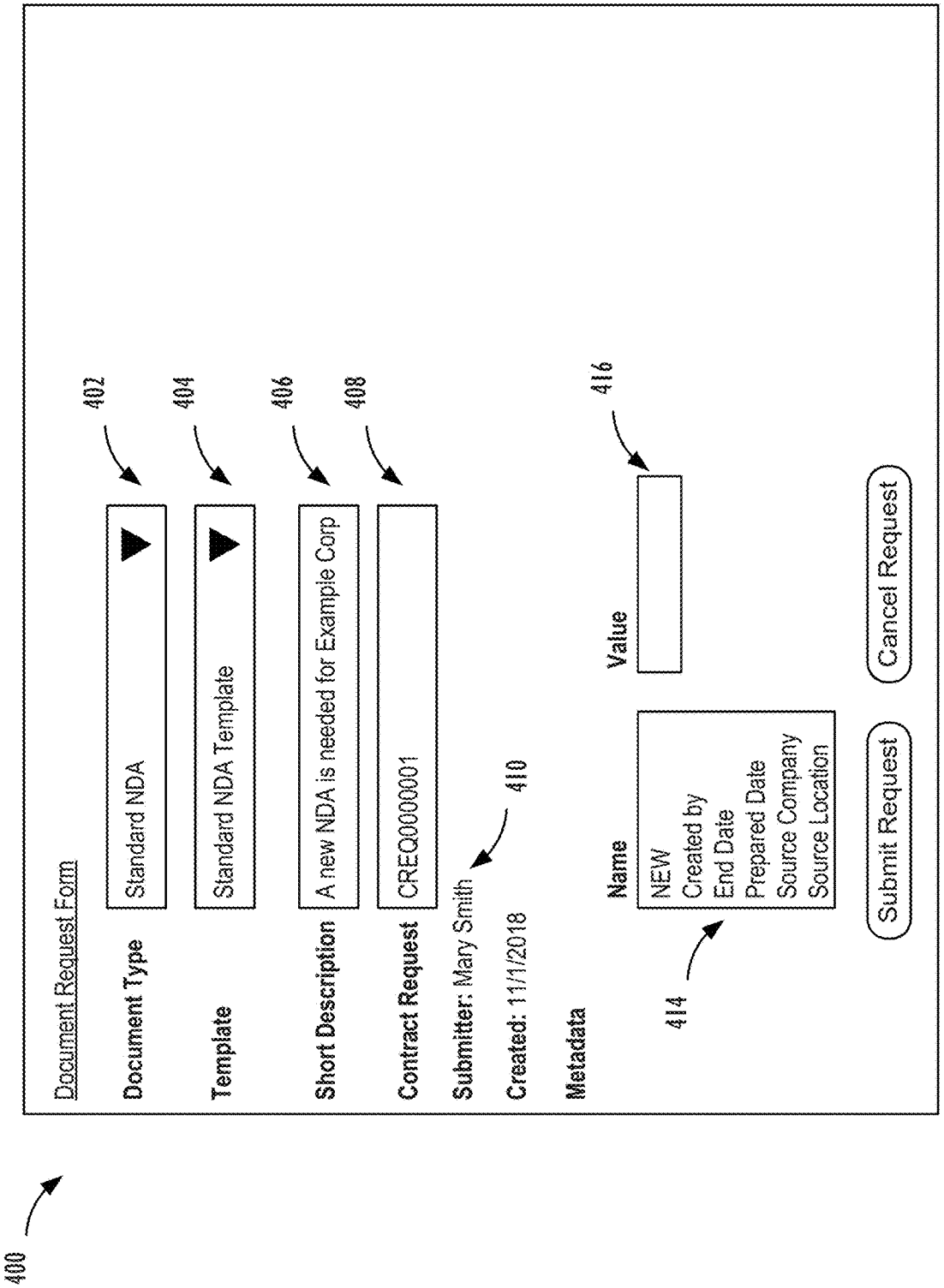
FIG. 4 illustrates a diagram of a user interface to receive a request to create a document.

FIG. 4 illustrates an example of a screen 400 of a portal GUI provided to a user to submit a request to generate a document. A request received by the client instance 302 to generate a document may correspond to input received through the screen 400. The screen 400 includes a document type input element 402. The document type input element is configured to receive input identifying a type of requested document. In the illustrated example, the document type input element 402 corresponds to drop down box but a different type of input element may be used.

The screen 400 further includes a template input element 404. The document type input element is configured to receive input identifying a document template. In the illustrated example the template input element 404 is a drop down box but a different type of input element may be used. The client instance 302 may populate selectable options included in the template input element 404 based on input received in the document type input element 402. For example, in response to receiving input indicating that the document type is "Standard NDA" in the document type input element 402, the client instance 302 may populate the template input element 404 with templates associated with the "Standard NDA" document type. Further, in some implementations, the client instance 302 may identify frequently used (e.g., top-n most frequently used) templates and identify these templates in the screen 400.

The screen 400 further includes a short description input element 406. In the illustrated example the short description input element 406 corresponds to a text box configured to receive a short description of a requested document. In other examples, a different type of input element may be used. In some implementations, the short description input element 406 may be prepopulated by the client instance based on a selected document type, a selected template, or a combination thereof.

The screen 400 further includes a document identifier input element 408. In the illustrated example the document identifier input element 408 corresponds to a text box configured to receive an identifier of a requested document. In some examples, the client instance 302 prepopulates the document identifier input element 408 based on a selected document type, a selected template, or a combination thereof.

The screen 400 further includes a requester identification element 410. In the illustrated example the requester identification element 410 corresponds to a text label configured to display an identifier of a user account associated with requesting the document. In some examples, the client instance 302 populates the requester identification element 410 automatically based on the user account that accesses the screen 400.

The screen 400 further includes a metadata tag input element 414. In the illustrated example the document metadata tag input element corresponds to a window configured to display and receive input of metadata tags. In some examples, the client instance 302 prepopulates the metadata tag input element 414 based on a selected document type, a selected template, or a combination thereof.

The screen 400 further includes a metadata value input element 416. In the illustrated example the metadata value input element 416 corresponds to a textbox configured to display and receive input of metadata values. In some examples, the client instance 302 prepopulates some metadata values based on a selected document type, a selected template, or a combination thereof.

Thus, FIG. 4 illustrates an example of a screen for requesting a document. In other implementations, different screens that include more, fewer, or different elements may be generated by the client instance 302.

In addition to generating the document data 304 based on the request to generate the document, the client instance 302 may further assign the document data 304 to one or more user accounts based on the request to generate the document. Assigning the document represented by the document data 304 to one or more user accounts may include setting editing and/or review privileges of the one or more user accounts with regard to the document data 304. For example, in response to the request to generate the document indicating that the document is a "standard NDA" the document data 304 may be assigned to user accounts associated with an NDA team. Further, a user account associated with a head of the NDA team may be granted editing and/or review privileges with regard to the document data 304.

Documents assigned to a user account may be accessible to a user device accessing the client instance 302 under the user account. For example, the document represented by the document data 304 may be assigned to a first user account and be accessible at the first user device 310 through the portal GUI provided by the client instance 302. Further, a document may be concurrently accessible at more than one user device. For example, the document represented by the document data 304 may also be assigned to a second user account and, while the document is accessed at the first user device 310, be accessible at the second user device 312 through the portal GUI provided by the client instance 302.

Figure 5:
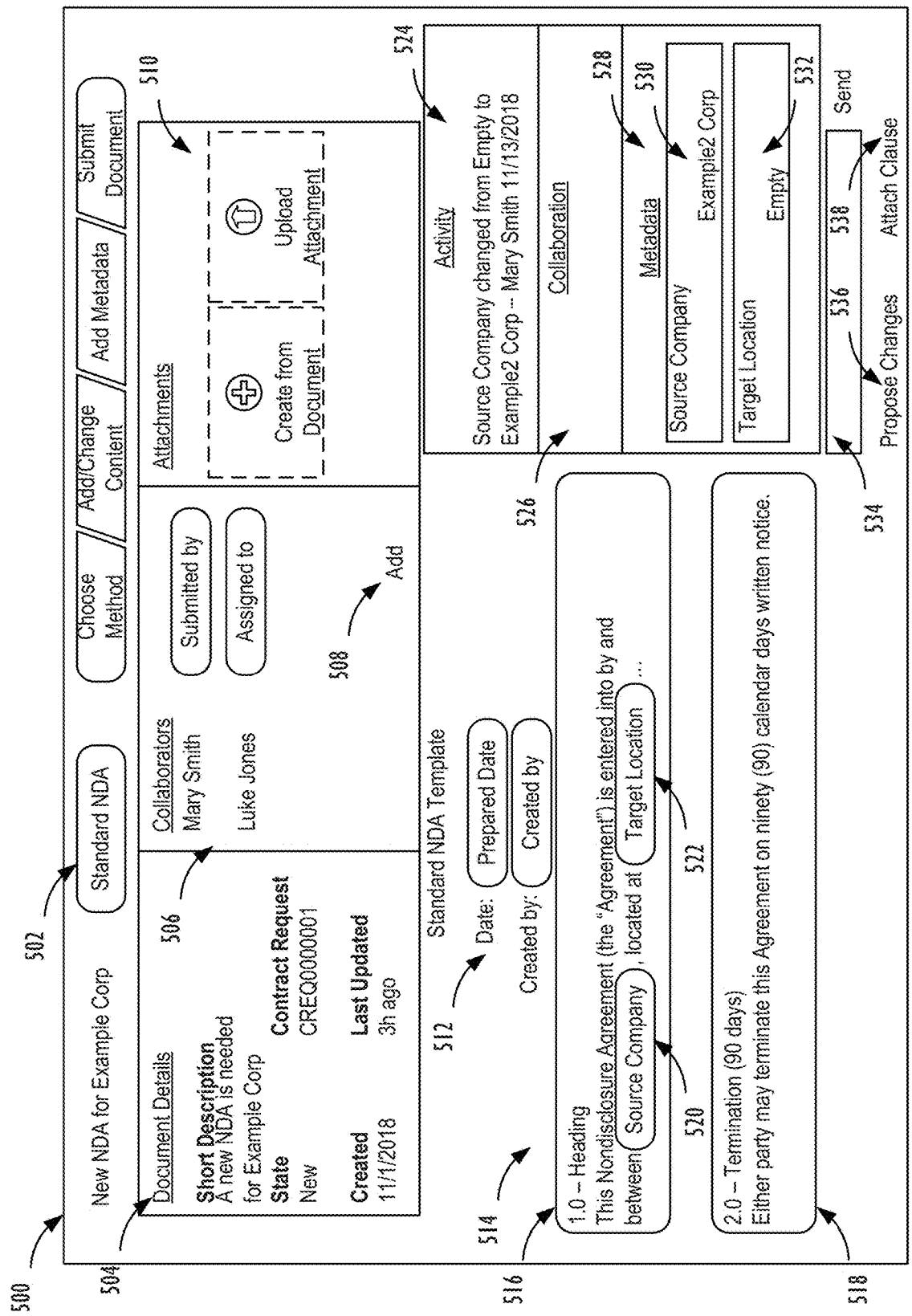
FIG. 5 illustrates a diagram of a user interface to display a document and collaboration information related to the document.

In response to a user device accessing the document represented by the document data 304, the client instance 302 is configured to transmit data associated with the document to the user device. The data may correspond to a GUI generated based on the document data 304. The GUI may be configured to display content of the document and receive input to edit the document. In addition, the GUI may be configured to display activity data indicating changes to the document and collaboration data including requests for permission to make changes to the document and chat messages. Further the GUI may be configured to display metadata values associated with the document. The client instance 302 may transmit data (e.g., a GUI) associated with a document to multiple user devices concurrently. Thus, multiple users may view and edit the document concurrently. The client instance 302 may generate a GUI sent to a user device based on editing and/or review privileges associated with a user account associated with the user device. FIG. 5 depicts an example of a screen 500 of a GUI generated based on document data and transmitted to a user device.

The screen 500 includes a document type display element 502. The document type display element 502 is configured to display document type of the document. In some examples, the document type is based on input received via the document type input element 402 of the screen 400.

The screen 500 further includes a document details display element 504. The document details display element 504 is configured to display various information related to the document. In the illustrated example, the document details display element 504 displays a short description of the document, a state of the document (e.g., whether the document is new, finalized, signed, etc.), a document identifier, a date the document was created, and an indication of a time the document was last edited. The client instance 302 may populate the short description based on input received via the short description input element 406. Similarly, the client instance 302 may populate the document identifier based on input received via the document identifier input element 408 of FIG. 2.

The screen 500 further includes an associated users display element 506. The associated users display element 506 is configured to display users (e.g., user accounts) associated with the document and roles associated with those users. As explained above, the client instance 302 may automatically assign the document to various users based on an input document type, an input document template, or a combination thereof. In some examples, the client instance 302 may further automatically assign a document to the user account that submitted the request that the document be created. In the illustrated example, the associated users display element 506 includes a selectable add user element 508. While not illustrated, the client instance 302 may be configured to display a user interface for assigning additional users (e.g., user accounts) to the document in response to receiving a selection of the selectable add user element 508. Thus, the client instance 302 may assign users to a document automatically and based on user input. In some implementations, the client instance 302 includes the add user element 508 in a GUI sent to a user account conditionally. For example, the client instance 302 may determine whether to include the add user element 508 in a GUI sent to a user device accessing a user account based on editing and/or review privileges associated with the user account.

The screen 500 further includes an attachment input element 510. The attachment input element 510 is configured to receive input identifying attachments to add to the document. The client instance 302 may store any identified attachments in the document data 304. In the illustrated example, the attachment input element 510 includes buttons associated with various attachment operations. For example, in the illustrated example, the attachment input element 510 includes selectable buttons associated with creating an attachment from a document and uploading an attachment. In response to detecting a selection of the button associated with uploading an attachment, the client instance 302 may display a prompt to receive identification of an attachment for upload. Similarly, in response to detecting a selection of the button associated with creating an attachment from a document, the client instance 302 may automatically generate an attachment from the current document that is being created. The generated attachment may be available in common formats such as PDF or DOC that can be downloaded from this GUI on the client instance 302.

The screen 500 further includes a template information display element 512. The template information display element 512 is configured to display information regarding a template used to prepare the displayed document. The information regarding the template may include a date on which the template was prepared, a user account associated with preparation of the template, or a combination thereof.

The screen 500 further includes a content display element 514. The content display element 514 is configured to display content of the displayed document. Content of the displayed document may be grouped into sections (e.g., clauses). These sections may include pre-approved sections populated from a template, sections added to the document after document creation, or a combination thereof. As explained below, the client instance 302 may trigger an approval process in response to receiving proposed changes to a section. In the illustrated example, the content display element 514 displays a first content section 516 and a second content section 518. The content sections and/or content within content sections may be placed in the document by the client instance 302 based on the template used to prepare the document, based on changes received from a user device, or a combination thereof. Instances of metadata tags may be embedded in content. In the illustrated example, a first instance 520 of a first metadata tag and a second instance 522 of a second metadata tag are embedded in the first content section 516. As described further below, upon publication, the client instance 302 may replace instances of metadata tags with corresponding metadata values.

The screen 500 further includes an activity display element 524. The client instance 302 populates the activity display element 524 based on activity data stored in the document data 304. In response to entering edits, adding attachments, adding collaborators, approvals or rejections, metadata updates, or making other changes to the document, the client instance 302 may update the activity data and the activity display element 524 accordingly. Thus, a user accessing the screen 500 may view a summary of changes made by various users to the document.

The screen 500 further includes a collaboration display element 526. The client instance 302 populates the collaboration display element 526 based on collaboration data stored in the document data 304. In response to receiving a request for permission to change the document from a user account not authorized to make the change, the client instance 302 may update the collaboration data and the collaboration display element 526 to include the request for permission, as explained further below. The client instance 302 may update the collaboration display element 526 to further include selectable options to accept or reject the request for permission in response to determining that editing and/or review privileges of a user account accessing the screen 500 satisfy a threshold. Further, in response to receiving a chat message associated with the document from a user device, the client instance 302 may update the collaboration data and the collaboration display element 526 to include the chat message. Thus, the collaboration display element 526 may allow users to collaborate during a document creation/editing process.

The screen 500 further includes a metadata value display element 528. The metadata value display element 528 is configured to display metadata values of metadata tags. In the illustrated example, the metadata value display element 528 displays a first metadata value 530 and a second metadata value 532. The client instance 302 may determine the metadata values based on the template selected for the document. In addition, or in the alternative, the client instance 302 may determine the metadata values based on input received from a user device via the screen 500. For example, the client instance 302 may be configured to display a prompt to enter a metadata value in response to receiving a selection of a metadata tag instance in the content display element 514 and/or in response to receiving a selection of a metadata value displayed in the metadata value display element 528. During a publication process, the client instance 302 may replace any instances of metadata tags with their corresponding values. For example, a document may include the phrase "This Nondisclosure Agreement (the "Agreement") is entered into by and between <Source Company> . . . " where <Source Company> is an instance of a metadata tag. During publication of the document, the client instance 302 may replace the instance of <Source Company> with a value (e.g., "Example 2 Corp") of the <Source Company> metadata tag.

The screen 500 further includes a chat message input element 534. The client instance 302 is configured to receive chat messages input via the chat message input element 534 and to update collaboration data of the document data 304 accordingly. The client instance 302 is configured to update the collaboration display element 526 as the collaboration data is updated. Since more than one user device may concurrently access GUIs displaying a document, users of the user devices may collaborate in real time.

The screen 500 further includes a first selectable option 536 to propose changes to the document and a second selectable option 538 to attach a clause (e.g., a new content section) to the document. The screen 500 may support receiving user input of proposed changes to the sections (e.g., clauses) displayed in the content display element 514. In response to receiving a selection of the first selectable option 536 to propose changes, the client instance 302 may determine whether a user account accessing the screen 500 has editing/review privileges that satisfy a threshold associated with editing the content of the document. In some implementations, sections of a document have independent privilege thresholds. In response to determining that the user account satisfies the threshold, the client instance 302 may make the proposed changes and update the document data 304, the content display element 514 and the activity display element 524 accordingly. In response to determining that the user account does not satisfy the threshold, the client instance 302 may update the collaboration data included in the document data 304 to include a request for permission to make the changes and update the collaboration display element 526 accordingly. The client instance 302 may include selectable options to accept or reject the changes in versions of the screen 500 sent to user devices associated with user accounts that satisfy the privilege thresholds associated with the changes. In response to receiving an indication of permission from a user device associated with a user account that satisfies the privilege threshold, the client instance 302 may make the proposed changes and update the document data 304, the content display element 514 and the activity display element 524 accordingly. Proposed changes may include changes to content and/or addition/deletion of instances of metadata tags.

In response to receiving a selection of the second selectable option 538 to attach a clause, the client instance 302 may initiate display of an element to receive input of a proposed new clause. In response to receiving input of the proposed new clause, the client instance may determine whether a user account accessing the screen 500 has editing/review privileges that satisfy a threshold associated with adding new clauses. The threshold associated with adding new clauses may be set by the client instance 302 based on the template used to generate the document. In response to determining that the user account satisfies the threshold, the client instance 302 may make the proposed addition and update the document data 304, the content display element 514 and the activity display element 524 accordingly. In response to determining that the user account does not satisfy the threshold, the client instance 302 may update the collaboration data included in the document data 304 to include a request for permission to make the change (e.g., add the new clause) and update the collaboration display element 526 accordingly. The client instance 302 may include selectable options to accept or reject the changes in versions of the screen 500 sent to user devices associated with user accounts that satisfy the privilege thresholds associated with the changes. In response to receiving an indication of permission from a user device associated with a user account that satisfies the privilege threshold, the client instance 302 may make the proposed changes and update the document data 304, the content display element 514 and the activity display element 524 accordingly.

Accordingly, the client instance 302 may support collaboration between user devices editing the same document. Such collaboration may include displaying chat messages, displaying editing activity, displaying requests for permission to edit the document, receiving and responding to replies to requests for permission to edit the document, or a combination thereof. It should be noted that the screen 500 is provided as an example and that the client instance 302 may generate different types of GUIs in other examples.

Figure 6:
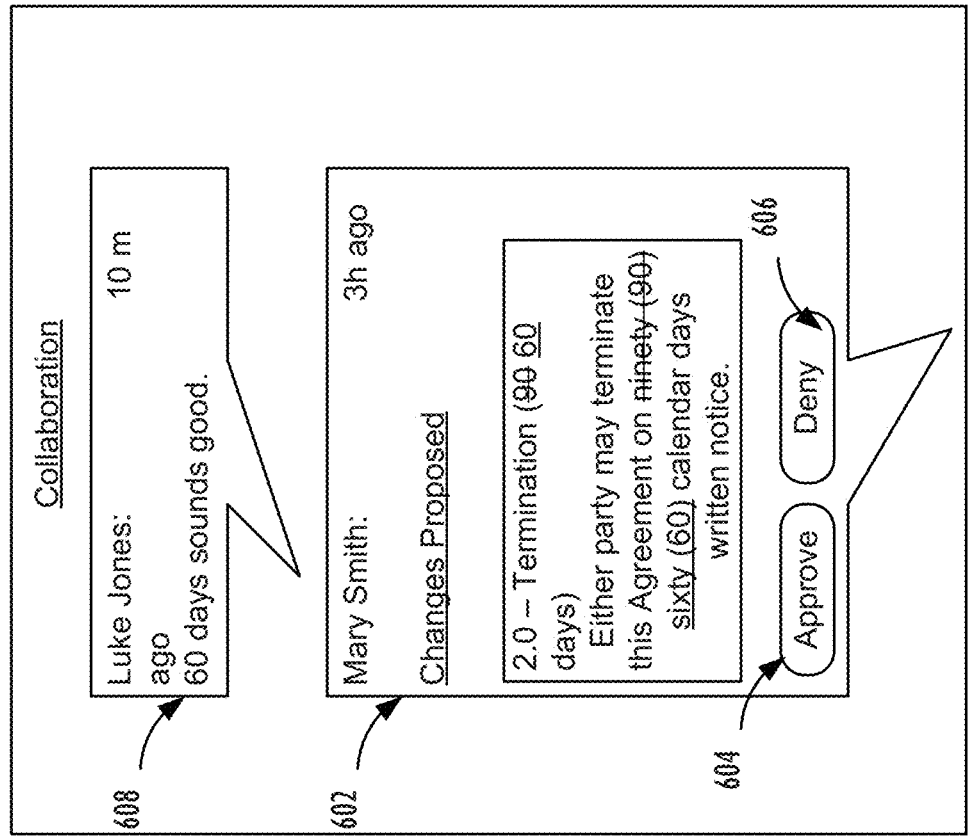
FIG. 6 illustrates a diagram of an updated collaboration display user interface element.

Referring to FIG. 6, an example of an updated version of the collaboration display element 526 is shown. In the illustrated example, the collaboration display element 526 displays a requested change 602 to the second content section 518 requested by Mary Smith's user account. In an illustrative use case, Mary Smith accesses her account through the first user device 310 and, in response to determining that the document associated with the document data 304 is assigned to Mary Smith's account, the client instance 302 transmits the screen 500 to the first user device. Using the screen 500 Mary Smith enters proposed changes to the second content section 518 and selects the first selectable option 536 to propose changes to the document. In response to selection of the first selectable option 536, the first user device 310 transmits a request to make the proposed changes to the client instance 302. In response to the request to make the proposed changes, the client instance determines whether Mary Smith's user account is associated with an editing and/or reviewing privilege that satisfies a threshold associated with making the proposed changes. In response to determining that Mary Smith's user account does not satisfy the threshold, the client instance 302 updates the collaboration data of the document data 304 to include the request to make the proposed changes and updates the collaboration display element 526 to display the requested change 602. The client instance 302 includes a selectable approve option 604 and a selectable reject option 606 in versions of the requested change 602 displayed at user devices associated with user accounts associated with an editing and/or reviewing privilege that satisfies a threshold. For example, Luke Jones's account may access the client instance 302 through the second user device 312 and because Luke Jones's account satisfies the threshold, the client instance 302 includes the selectable approve option 604 and the selectable reject option 606 in a version of the screen 500 sent to the second user device 312. In response to receiving permission to make the proposed change (e.g., a selection of the selectable approve option 604), the client instance 302 may update the second content section 518 based on the proposed changes.

The illustrated example of the updated version of the collaboration display element 526 further includes a chat message 608 from Luke Jones. To illustrate, the second user device 312 may input a message through the message input element 534 displayed on a version of the screen 500 sent to the second user device 312. The client instance 302 may receive the message from the second user device and update collaboration data of the document data 304 and the collaboration display element 526 to include the chat message 608.

Thus, FIG. 6 illustrates an example of collaboration between multiple parties to edit a document. Accordingly, a document may be easily edited in real-time reducing time spent generating a document.

Figure 7:
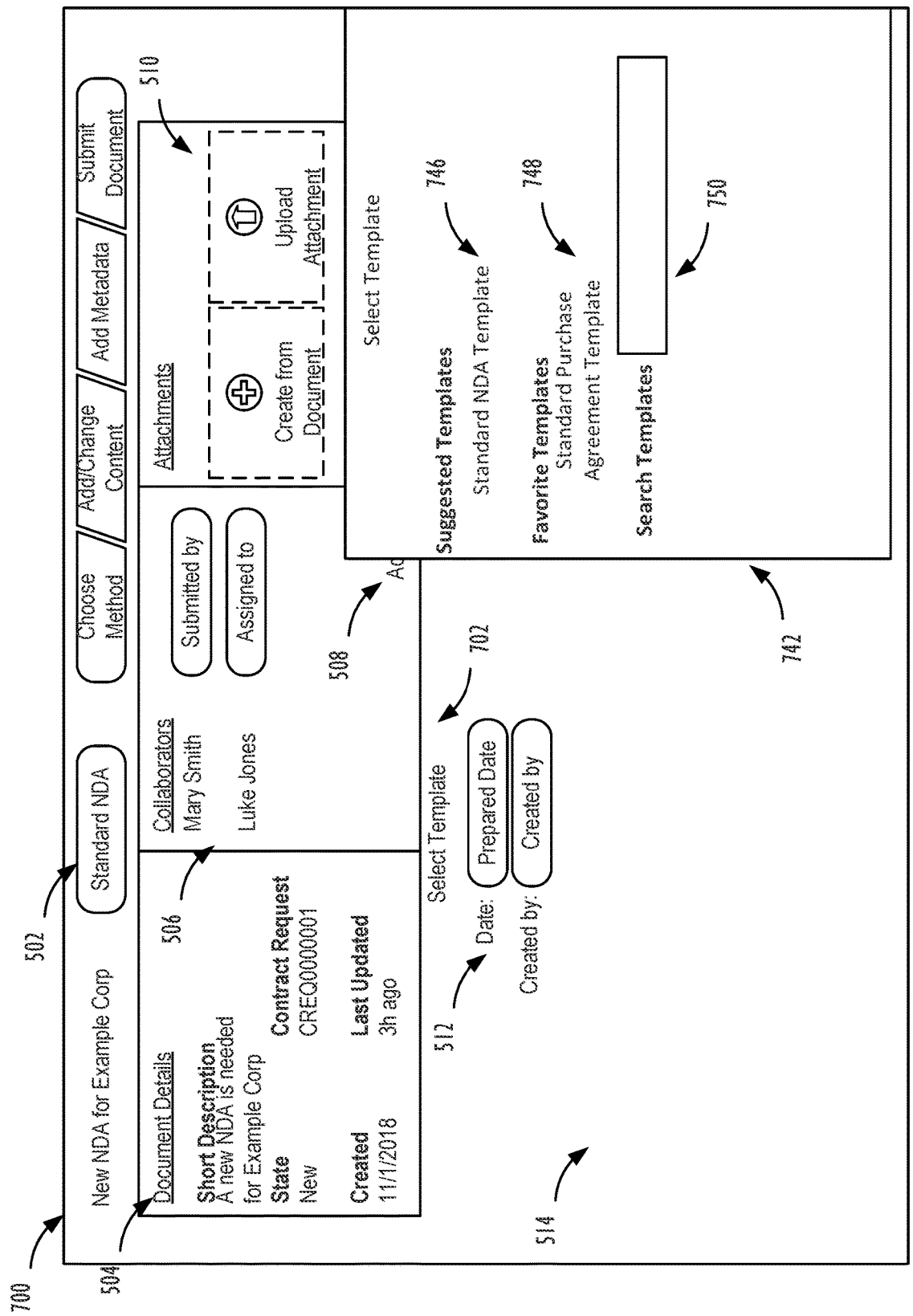
FIG. 7 illustrates a diagram of a user interface to receive selection of a template.

Referring to FIG. 7, a screen 700 that may be generated by the client instance 302 in response to a document request that does not identify a template or metadata is shown. For example, alternative versions of the screen 400 may not include the template input element 404 or the metadata input elements 414, 416. Alternatively, a user may submit a document request using the screen 400 without populating the template input element 404 or the metadata input elements 414, 416. As explained above, the client instance 302 may assign a document to one or more user accounts based on a received document request. Using the screen 700, an assigned user account may add additional users and select a template.

As illustrated in FIG. 7, the content display element 514 does not include any sections because no template has been selected for the document. The screen 700 is configured to receive selection of a template. In the illustrated example, the screen 700 includes a template selection interface 742 that may be displayed by the client instance 302 in response to receiving a selection of a template select button 702. In the illustrated example, the template selection interface 742 is populated with suggested templates 742. The suggested templates 742 may be identified by the client instance 302 based on information received in a document request (e.g., based on a document type identified in the document type input element 404). In the illustrated example, the template selection interface 742 is further populated with favorite templates 748. The client instance 302 may store "favorite" templates on a per user account basis and identify the favorite templates 748 included in the template selection interface 742 based on the user account accessing the screen 700. In some implementations, the screen 700 includes an option to save a selected template as a favorite template of a user account. Responsive to a selection of the option to save a selected template as a favorite, the client instance 302 may store data indicating that the selected template is a favorite of the user account. In the illustrated example, the template selection interface 742 further includes a search templates element 750. The client instance 302 may be configured to identify one or more stored templates based on input (e.g., a text string) received at the search templates element 750. Any templates identified in response to such a search may be identified in the template selection interface 742.

In response to receiving a selection of a template through the template selection interface 742 the client instance 302 may update the content display element 514 based on content included in the selected template. Thus, FIG. 7 illustrates an example of a screen that may be used by a user assigned to a document to select a template.

In an example use case for the multi-instance cloud architecture 300, Mary Smith accesses her user account on the client instance 302 through the first user device 310 and requests a new NDA using the screen 400. The client instance 302 creates a new document represented by the document data 304 based on the document request and assigns the new document to user accounts on an NDA team based on the type of the document. In response to a member of the NDA team accessing his/her account on the client instance 302, the client instance 302 sends the screen 700 to the NDA team member so that the NDA team member may assign a template to the document and/or assign the document to additional collaborators (e.g., other user accounts). In response to receiving a selected template, the client instance 302 updates the document data 304 accordingly. Accordingly, the client instance 302 displays a screen including prepopulated content to the NDA team member and other collaborators who access the document. Collaborators can concurrently access the document through the screen 500. While concurrently accessing the document, the collaborators can exchange messages in the collaboration display element 526 and view document activity in the activity display element 524. Further, the collaborators can edit the sections displayed in the content display element 514 and edit the values of the metadata tags displayed in the metadata value display element 528. The client instance 302 obtains permission from an approving user account through the collaboration display element 526 before making changes to content and/or metadata associated with an editing privilege threshold. In response to receiving a request to finalize the document, the client instance 302 sends a request to approve the document to an approving request (e.g., through the collaboration display element 526 or an alternate communication channel, such as E-mail, SMS, etc.)

Thus, the multi-instance cloud architecture 300 may support collaboration in real-time and more efficient of content change requests as compared to offline document editing software. In particular, the multi-instance cloud architecture 300 may support real time collaboration.

Figure 8:
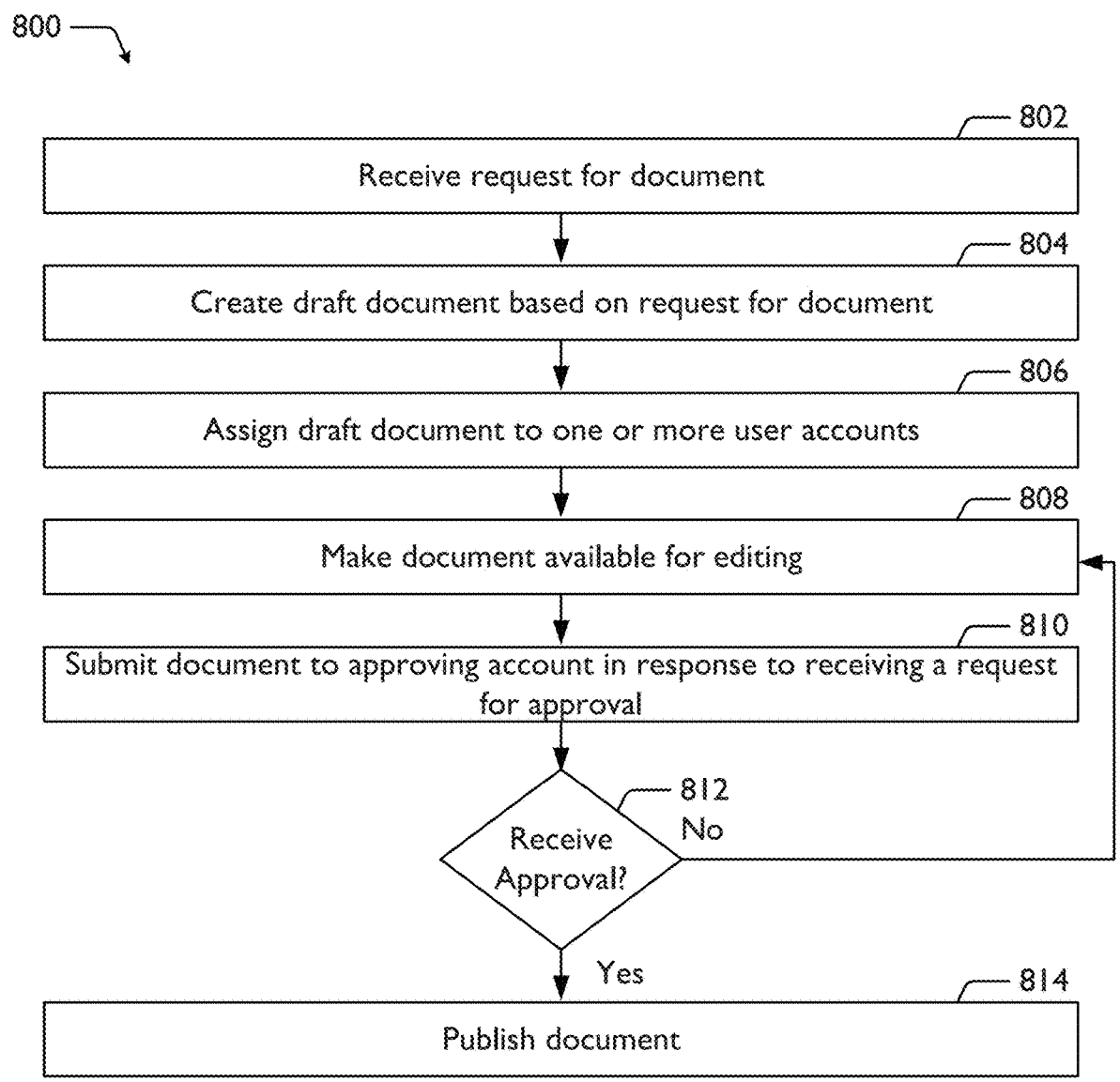
FIG. 8 illustrates a flowchart of a method of collaboratively creating and publishing a document.

Referring to FIG. 8 a flowchart illustrating a method 800 of supporting document collaboration is shown. The method 800 may be performed by a client instance, such as the client instance 302. The method 800 includes receiving a request for a document, at 802. For example, the client instance 302 may receive a request to create a document from the first user device 310 (e.g., using the screen 400 to submit a request to generate a document).

The method 800 further includes creating a draft document based on the request for the document, at 804. For example, the client instance 302 may create the document data 304 based on information input via the screen 400 the request to create a document received from the first user device 310. To illustrate, the client instance 302 may create the document data 304 using a selected document template. Document templates may include pre-drafted content sections, metadata tags, metadata values, or a combination thereof. In some implementations, the client instance 302 forwards the request to create the document to a reviewing account associated with reviewing document requests and may create the document in response to receiving approval from the reviewing account. The client instance 302 may select the reviewing account based on a document template identified by the request to create a document, a document type identified by the request to create a document, some other factor, or a combination thereof.

The method 800 further includes assigning the draft document to one or more user accounts, at 806. For example, the client instance 302 may assign a draft document to one or more user accounts based on input received via the screen 400, based on input received from a reviewer account, or a combination thereof.

The method 800 further includes making the document available for editing, at 808. For example, the client instance 302 may distribute versions of the screen 500 to user devices that access the client instance 302 using accounts associated with the document. A method of editing the document is described further below with respect to FIG. 9.

The method 800 further includes submitting the document to an approving account in response to receiving a request for approval, at 810. For example, the client instance 302 may update the collaboration display element 526 of a version of the screen 500 sent to an approving account to display a request to approve the document in response to receiving a request to approve the document. The client instance 302 may identify the approving account based on input received via the screen 400, based on input received via the screen 500, based on input received from a reviewer account, or a combination thereof.

In response to receiving a rejection of the document, at 812, the method includes continuing to make the document available for editing, at 808. In response to receiving approval of the document, at 812, the method includes publishing the document, at 814. For example, in response to receiving approval of the document from the approving account, the client instance 302 may publish the document. Publishing the document may include converting the document to a different file format (e.g., pdf), replacing instances of metadata tags with corresponding metadata values, or a combination thereof.

In addition to the illustrated steps, the method 800 may include sending the published document to one or more signing parties (e.g., computing devise associated with one or more signing parties). In some implementations, the sending the published document to one or more signing parties includes interfacing with a third party document signing service. The one or more signatories may sign the published document or reject the published document. In response to receiving the signed document, the client instance 302 may store the signed document and/or disseminate the signed document to one or more interested parties. In response to receiving a rejection of the document, the client instance 302 may make the document available for editing at 808. The rejection may include a comment that the client instance 302 may add any comment received in the rejection to the collaboration display element 526 and/or the activity display element 524 of the screen 500.

Figure 9:
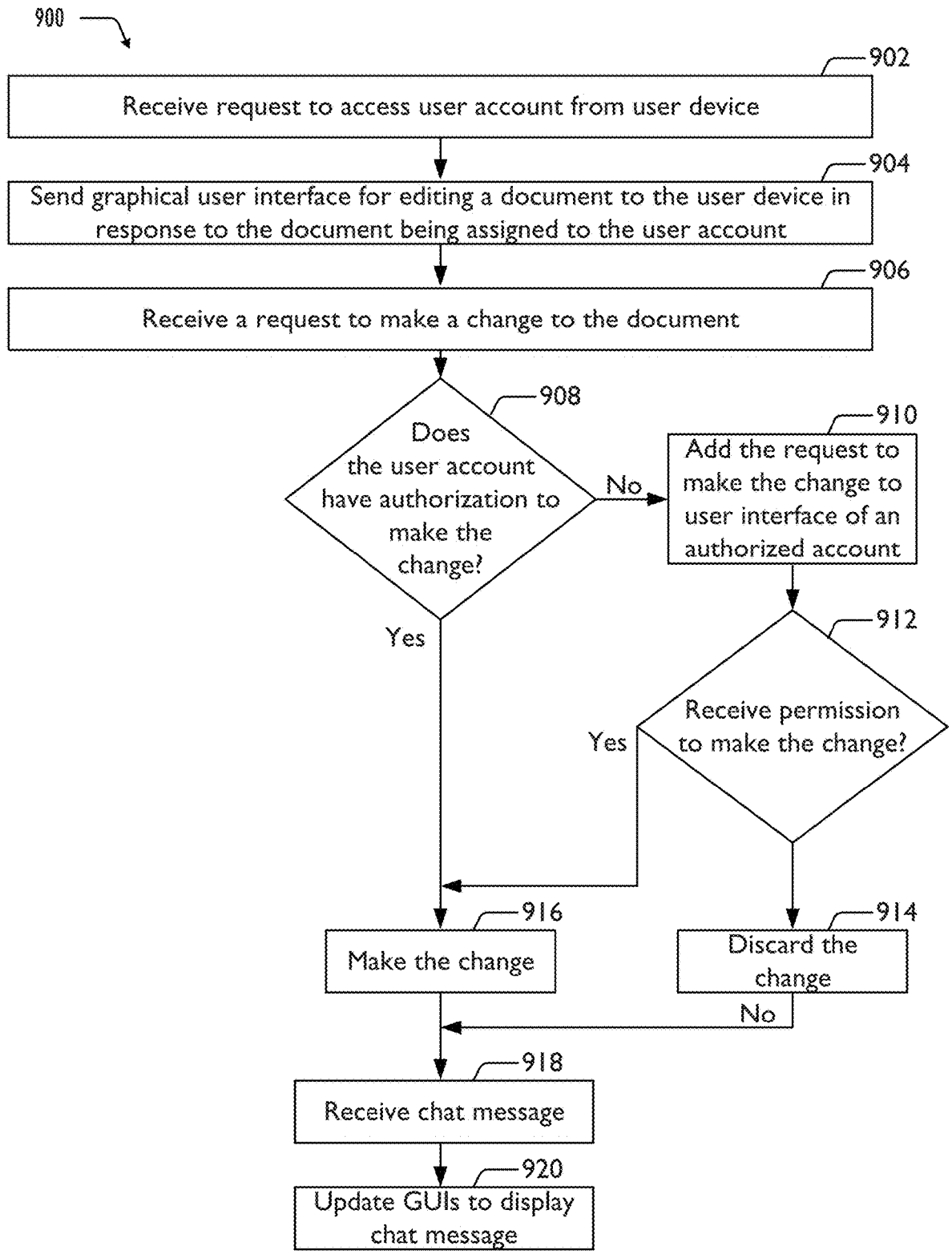
FIG. 9 illustrates a flowchart of a method of collaboratively editing a document.

Referring to FIG. 9, a flowchart illustrating a method 900 of editing a document is shown. The method 900 may be performed by a client instance, such as the client instance 302, while a document is available for editing, at 808 of FIG. 8. The method 900 includes receiving a request to access a user account from a user device, at 902. For example, the client instance 302 may receive a request to access a first user account from the first user device 310.

The method bb further includes sending a graphical user interface for editing the document to the user device in response to the document being assigned to the user account, at 904. For example, in response to determining that the document corresponding to the document data 304 is assigned to the first user account, the client instance 302 may send a version of the screen 500 to the first user device 310. It should be noted that a version of the screen 500 may be sent to another user device concurrently. For example, in response to receiving a request to access a second user account from the second user device 312 and determining that the document is assigned to the second user account, the client instance 302 may send a second version of the screen 500 to the second user device 312.

The method 900 further includes receiving a request to make a change to the document, at 906. For example, the first user device 310 may transmit a request to make a change to the document responsive to user input received via the screen 500. For example, a user may input changes to a selected content section and/or propose addition of a new content section through the screen 500.

The method further includes determining whether the user account has authorization to make the proposed change, at 908. For example, the client instance 302 may compare an editing and/or review privilege associated with the first user account to a threshold associated with making the proposed change. In response determining that the user account is authorized to make the change, the method 900 includes making the change, at 916. For example, the client instance 302 may update the document data 304 based on the proposed change, update the content display element 514 based on the proposed change, update the activity display element 524 based on the proposed change, or a combination thereof.

In response determining that the user account is not authorized to make the change, the method 900 includes adding the request to make the change to a user interface of an authorized account, at 910. For example, the client instance 302 may add a proposed change to the collaboration display element 526 in a version of the screen 500 sent to a user device (e.g., the second user device 312) associated with an authorized account, as illustrated in FIG. 6.

The method 900 further includes determining whether permission to make the change is received, at 912. In response to determining that permission to make the change is not received, the method 900 includes discarding the change, at 914. For example, in response to receiving an indication that the selectable reject option 606 has been selected from the second user device 312, the client instance 302 may discard the proposed change. In some implementations, the client instance 302 updates activity data of the document data 304 and updates the activity display element 524 to indicate rejected changes.

In response to determining that permission to make the change is received, the method 900 includes making the change, at 916. For example, in response to receiving an indication that the selectable approve option 604 has been selected from the second user device 312, the client instance 302 may make the proposed change as described above.

The method 900 further includes receiving a chat message, at 918. For example, the client instance 302 may receive the chat message 608 from the second user device 312 through the message input element 534 of the version of the screen 500 sent to the second user device 312. The method 900 further includes updating GUIs to display the chat message, at 920. For example, the client instance 302 may update the collaboration display element 526 to display the chat message 608 in both the version of the screen 500 sent to the first user device 310 and the version of the screen 500 sent to the second user device 312.

Thus, the method 900 may be used to provide support for collaborative document editing. Such collaborative document editing may be carried out in real time and may be more convenient as compare to document editing techniques carried out offline.

Figure 10:
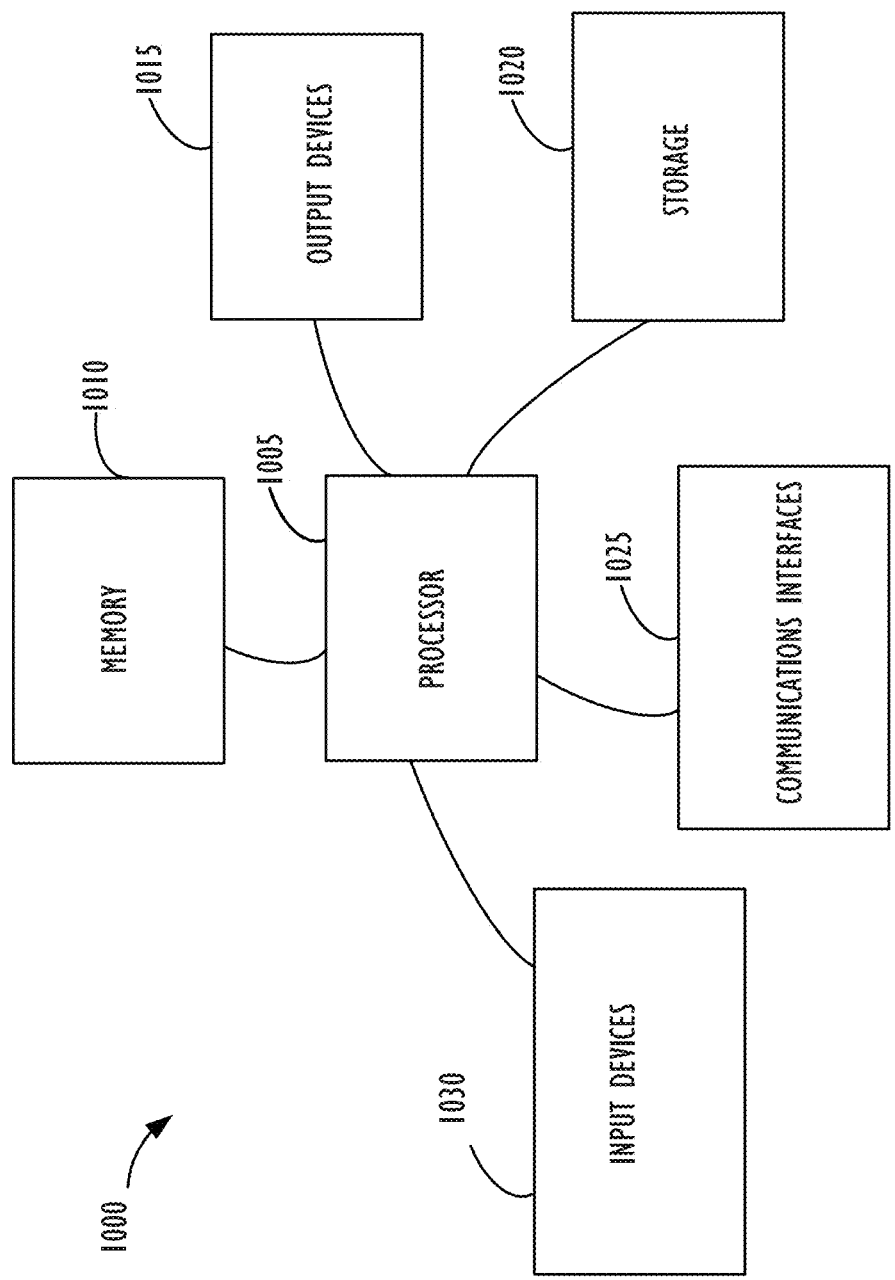
FIG. 10 illustrates a high-level block diagram of a processing device (computing system) 1000 that may be used to implement one or more disclosed embodiments.

FIG. 10 illustrates a high-level block diagram of a computing device (computing system) 1000 that may be used to implement one or more disclosed embodiments (e.g., cloud resources platform/network 110, client devices 104A-104E, client instance 208, server instances 114, client instance 302, first user device 310, second user device 312, etc.). For example, the computing device 1000 illustrated in FIG. 10 could represent a client device or a physical server device and include either hardware or virtual processor(s) depending on the level of abstraction of the computing device. In some examples (without abstraction) the computing device 1000 and its elements as shown in FIG. 10 each relate to physical hardware and in some examples one, more, or all of the elements could be implemented using emulators or virtual machines as levels of abstraction. In any case, no matter how many levels of abstraction away from the physical hardware, the computing device 1000 at its lowest level may be implemented on physical hardware. As also shown in FIG. 10, the computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display). The computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 10, the computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 10, the processing elements that make up processor 1005 may also include one or more other types of hardware processing components, such as graphics processing units (GPUs), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more volatile devices such as random access memory (RAM). Non-volatile storage devices 1020 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 1000 may comprise other components well known in the art, such as sensors, powers sources, and/or analog-to-digital converters, not explicitly shown in FIG. 10.

Figure 11:
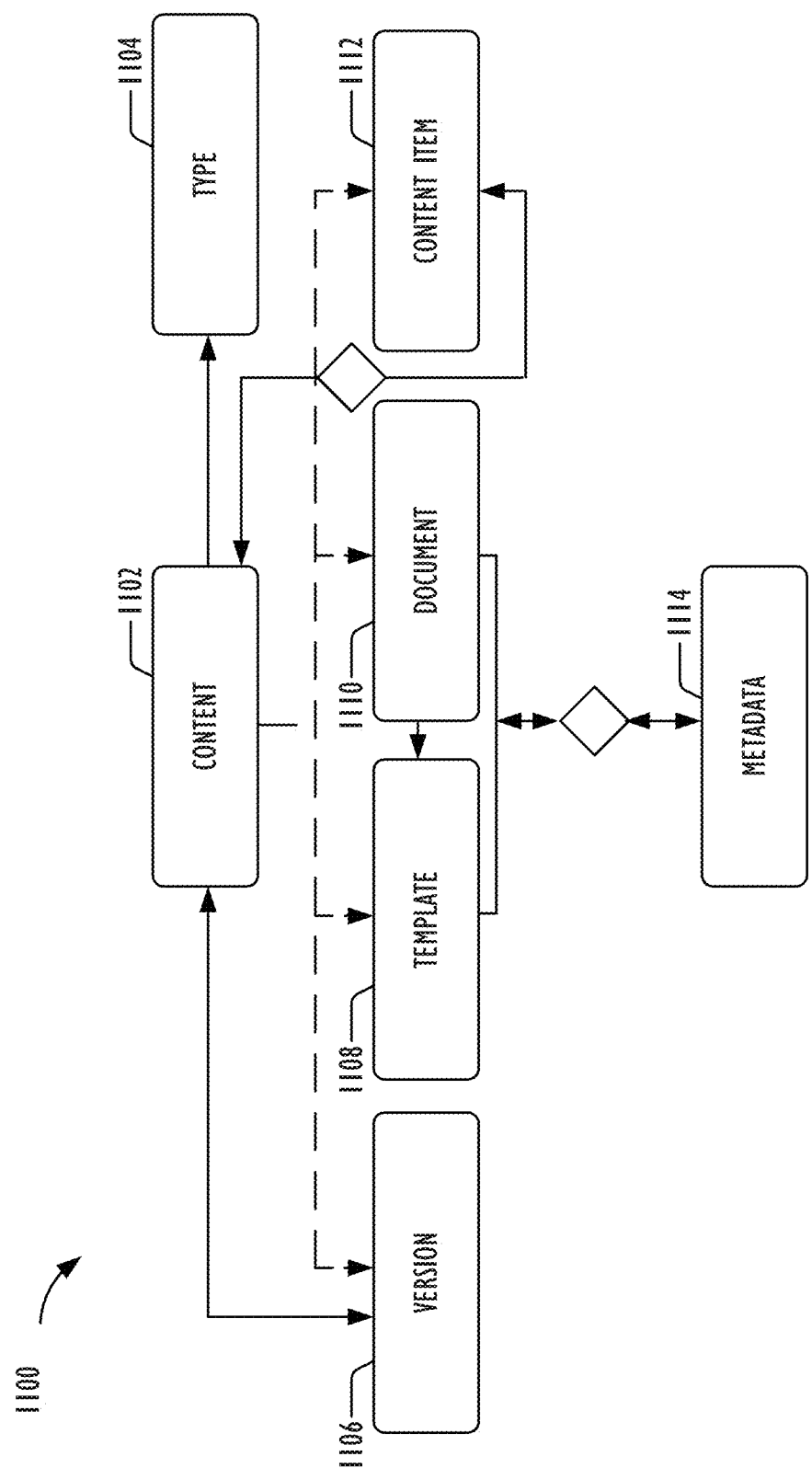
FIG. 11 illustrates an example of a data model that may be implemented by systems and methods that support document collaboration.

Referring to FIG. 11, a diagram of a data model 1100 that may be implemented by the disclosed systems and methods is shown. For example, the document data 304 may be arranged according to the data model 1100. In the diagram of FIG. 11, dashed lines represent an "extends" relationship. A data object that extends a second data object implements includes attributes of the second data object. Solid lines represent a "references" relationship. For example, a first data object may include a reference to a second data object. Diamonds indicate "many-to-many" relationships. For example, a first object may reference many of a particular type of object.

The data model 1100 indicates that a content data object 1102 references a type data object 1104 that indicates a data type of the of the content data object 1102. A version data object 1106, a template data object 1108, a document data object 1110, and a content item data object 1112 extend the content data object 1102. The content data object 1102 further references the version data object 1106. For example, an instance of the content data object 1102 may have a version number indicated by a version data object 1106. The content data object 1102 further references many content item data objects 1112, and the content item data object 1112 references many content data objects 1102. Examples, of content data items include content sections, collaboration data (e.g., messages, requests for permission, etc.), and activity data. Because the document data object 1110 extends the content data object 1102, the document data object 1110 may also reference many content item data objects 1112 and be referenced by many content item data objects 1112.

The document data object 1110 further references the template data object 1108. Accordingly, the document data object 1110 may include content data item objects 1112 referenced by the template data object 1108. Both the document data object 1110 and the template data object 1108 have a many-to-many reference relationship with a metadata data object 1114. An instance of the metadata data object 1114 may define a metadata tag and a corresponding metadata value. Thus, FIG. 11 illustrates an example of a data model that may be implemented by systems and methods that support document collaboration.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method comprising:
    transmitting, from a service platform customer instance, first data associated with a document to a first user device;
    transmitting, from the service platform customer instance, second data associated with the document to a second user device;
    receiving, at the service platform customer instance, a first request from the first user device to make a change to the document from the first user device, wherein the first request identifies the change to the document;
    transmitting, from the service platform customer instance to the second user device, a second request for permission to make the change identified from the first request to the document; and
    updating, at the service platform customer instance, the document based on the change in response to receiving, from the second user device, permission to make the change identified from the first request to the document.

2. The method of claim 1, wherein the first data corresponds to a first graphical user interface displaying the document and the second data corresponds to a second graphical user interface displaying the document.

3. The method of claim 2, wherein the first graphical user interface includes an element configured to display messages from users associated with the document.

4. The method of claim 2, wherein the document includes an instance of a metadata tag, and wherein the first graphical user interface includes an element configured to receive a value of the metadata tag.

5. The method of claim 4, comprising:
    receiving the value of the metadata tag; and
    replacing the instance of the metadata tag in the document with the value of the metadata tag in a finalized version of the document.

6. The method of claim 2, wherein the second graphical user interface includes an element configured to display the second request for permission to make the change.

7. The method of claim 1, comprising:
    receiving, at the service platform customer instance, a third request to create the document, the third request identifying a type of the document; and
    identifying, at the service platform customer instance, a reviewer account based on the type of the document.

8. The method of claim 7, wherein the second data is transmitted to the second user device in response to the reviewer account accessing the service platform customer instance from the second user device.

9. A computer readable storage device storing instructions executable by one or more processors to:
    transmit, from a service platform customer instance, first data associated with a document to a first user device;
    transmit, from the service platform customer instance, second data associated with the document to a second user device;
    receive, at the service platform customer instance, a first request from the first user device to make a change to the document from the first user device, wherein the first request identifies the change to the document;
    transmit, from the service platform customer instance to the second user device, a second request for permission to make the change identified from the first request to the document; and
    update, at the service platform customer instance, the document based on the change in response to receiving, from the second user device, permission to make the change identified from the first request to the document.

10. The computer readable storage device of claim 9, wherein the first data corresponds to a first graphical user interface displaying the document and the second data corresponds to a second graphical user interface displaying the document.

11. The computer readable storage device of claim 10, wherein the first graphical user interface includes an element configured to display messages from users associated with the document.

12. The computer readable storage device of claim 10, wherein the document includes an instance of a metadata tag, and wherein the first graphical user interface includes an element configured to receive a value of the metadata tag.

13. The computer readable storage device of claim 12, wherein the instructions are executable by the one or more processors to:
    receive the value of the metadata tag; and
    replace the instance of the metadata tag in the document with the value of the metadata tag in a finalized version of the document.

14. The computer readable storage device of claim 10, wherein the second graphical user interface includes an element configured to display the second request for permission to make the change.

15. The computer readable storage device of claim 9, wherein the instructions are executable by the one or more processors to:
    receive, at the service platform customer instance, a third request to create the document, the third request identifying a type of the document; and
    identify, at the service platform customer instance, a reviewer account based on the type of the document.

16. The computer readable storage device of claim 15, wherein the second data is transmitted to the second user device in response to the reviewer account accessing the service platform customer instance from the second user device.

17. An apparatus comprising:
    one or more processors; and
    one or more memory devices storing instructions executable by one or more processors to:
        transmit, from a service platform customer instance, first data associated with a document to a first user device;
        transmit, from the service platform customer instance, second data associated with the document to a second user device;
        receive, at the service platform customer instance, a first request from the first user device to make a change to the document from the first user device, wherein the first request identifies the change to the document;
        transmit, from the service platform customer instance to the second user device, a second request for permission to make the change identified from the first request to the document; and
        update, at the service platform customer instance, the document based on the change in response to receiving, from the second user device, permission to make the change identified from the first request to the document.

18. The apparatus of claim 17, wherein the first data corresponds to a first graphical user interface displaying the document and the second data corresponds to a second graphical user interface displaying the document.

19. The apparatus of claim 18, wherein the first graphical user interface includes an element configured to display messages from users associated with the document.

20. The apparatus of claim 18, wherein the document includes an instance of a metadata tag, and wherein the first graphical user interface includes an element configured to receive a value of the metadata tag.

* * * * *